(12) United States Patent
Hashimoto et al.

(10) Patent No.: US 6,333,371 B1
(45) Date of Patent: Dec. 25, 2001

(54) COATING COMPOSITION FOR COLORING A GLASS, PROCESS FOR THE PRODUCTION THEREOF AND USE THEREOF

(75) Inventors: Toshiyuki Hashimoto; Naohisa Hirata; Tetsuro Oizumi; Hisao Tanaka, all of Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/300,382

(22) Filed: Apr. 27, 1999

(30) Foreign Application Priority Data

Apr. 27, 1998 (JP) ................................................. 10-116362
Apr. 27, 1998 (JP) ................................................. 10-116363

(51) Int. Cl.$^7$ ............................... C03C 17/32; C08K 5/34
(52) U.S. Cl. .......................... 524/100; 524/266; 524/394; 524/398; 524/399
(58) Field of Search ..................................... 524/100, 266, 524/394, 398, 399; 428/429

(56) References Cited

FOREIGN PATENT DOCUMENTS

| 0 335 680 | 10/1989 | (EP) . |
| 0 504 926 | 9/1992 | (EP) . |
| 0 710 706 | 5/1996 | (EP) . |
| 0 822 240 | 2/1998 | (EP) . |
| 2 275 477 | 8/1994 | (GB) . |

*Primary Examiner*—D. S. Nakarani
(74) *Attorney, Agent, or Firm*—Wenderoth, Lind & Ponack, LLP

(57) ABSTRACT

A coating composition for coloring a glass, containing an organic pigment, a pigment dispersant, a silicon alkoxide compound or a metal alkoxide compound and an organic resin, a process for the production thereof and use thereof.

10 Claims, No Drawings

COATING COMPOSITION FOR COLORING A GLASS, PROCESS FOR THE PRODUCTION THEREOF AND USE THEREOF

FIELD OF THE INVENTION

The present invention relates to a coloring coating composition, which facilitates a recycle of colored glass products and is used for forming a colored glass gel thin film on a glass surface, a process for the production thereof and use thereof. More specifically, it relates to a coating composition for coloring a glass, which can recycle a colored glass product as a colorless glass by making the colored glass product colorless at a re-melting time, a process for the production thereof and use thereof.

PRIOR ART OF THE INVENTION

Recently, it is highly demanded to recycle resources in view of the preservation of resources and environmental conservation.

Glass is mainly formed of silicon dioxide which exists in abundance on the earth and can be reused by recovering and re-melting it as a cullet, so that it is a superior material in view of the conservation of resources and recycling. However, glass products include colorless products and colored products. Various transition metals are used for coloring, so that it is difficult to return colored products to colorless glass by re-melting. Therefore, when colorless glass products and colored glass products are recovered together, it is difficult to carry out a recycling treatment at a time. Therefore, it is required to recover the colorless glass products and the colored glass products separately. As a result, the recycling rate thereof remains at a low rate.

Thereat, as a method of converting a colored glass to a colorless glass at a re-melting time, there is proposed a method of coating a glass with a colored glass gel thin film by using a sol-gel method, that is, a method of forming a colored glass gel thin film on a glass by coating the glass with a metal alkoxide solution containing an organic coloring matter and calcinating the coated glass at a low temperature.

For example, JP-A-1-320742 proposes a method of applying a metal alkoxide solution containing an organic dye onto a glass and calcinating the coated glass, to form a glass gel thin film. However, in point of the decomposition temperature of the organic dye, calcination must be carried out at 300° C. or less. The so-obtained glass thin film has extremely many pores and it is a porous film. As a result, there is caused a problem of water-resistance, that is, a problem in that coloring matter is eluted by the ingression of water or agents from the pores. Further, since the glass gel thin film permits the transmission of oxygen or the like, resistance to ultraviolet is poor and the coloring matter is oxidized and loses its color.

For overcoming the above problems, JP-A-5-178623 publication proposes a method in which color particles having larger diameter than that of pores of a glass gel thin film and a coating composition containing a dispersant having an absorption function for the color particles are used, and calcination is carried out 300° C. or less, to form a glass gel thin film. However, this method can not give sufficient water-resistance and resistance to ultraviolet. Further, when an organic pigment is used as coloring matter, the dispersibilty and dispersion stability of the pigment are insufficient. Furthermore, sufficient qualities are not obtained in fluidity, shelf life and gloss, transparency, clearness and tinting strength of a coating film.

For improving water-resistance and resistance to ultraviolet of the above problems, JP-A-9-239311 proposes a method in which a glass gel thin film is formed by applying a metal alkoxide solution containing a specific high molecular ultraviolet-absorber onto a glass bottle and calcinating it. However, when an organic pigment is used, this method has the same problems as above.

SUMMARY OF THE INVENTION

It is an object of the present invention to provide a coating composition for coloring a glass, which is excellent in fluidity and shelf life.

It is an another object of the present invention to provide a composition for coloring a glass, which can give a coating film having ultraviolet light and/or visible light absorbing properties, water resistance and resistance to ultraviolet free from the discoloration of coloring matter by oxidation and resistance to flaw when applied to a glass, and a glass coated with this composition.

It is further another object of the present invention to provide a composition for coloring a glass, which can give a coating film excellent in gloss, transparency and clearness, and a glass coated with this composition.

It is still another object of the present invention to provide a composition for coloring a glass, which is excellent in tinting strength.

It is still further another object of the present invention to provide a process for the production of a composition for coloring a glass, which composition has the above properties According to the present invention, there is provided a coating composition for coloring a glass, containing an organic pigment, a pigment dispersant, a silicon alkoxide compound or a metal alkoxide compound, and an organic resin.

According to the present invention, the coating composition further contains an alkoxysilane compound containing a polymerizable organic group.

According to the present invention, the pigment dispersant is at least one selected from the group consisting of a surface active agent, a resin type dispersant and an organic color residue-containing or heterocyclic ring residue-containing amine derivative.

According to the present invention, the organic color residue-containing or heterocyclic ring residue-containing amine derivative is a compound of the formula (1),

$$P\text{—}\{X\text{—}Y\text{—}Z\text{—}N(R^1)R^2\}_n \qquad (1)$$

wherein P is an organic color residue or a heterocyclic ring residue, X is a divalent bonding group which is composed of 2 to 15 atoms selected from the group consisting of S, C, N, O and H and has a chemically rational combination, Y is a direct bond or —N(R)—, in which R is H, an alkyl group having 1 to 18 carbon atoms or —Z—N(R$^1$)R$^2$, Z is an alkylene group having 1 to 6 carbon atoms, each of R$^1$ and R$^2$ is independently a substituted or non-substituted alkyl group having 1 to 18 carbon atoms or a combination of R$^1$ and R$^2$ is a substituted or non-substituted heterocyclic ring which may contain N, O or S, and n is an integer of 1 to 3.

According to the present invention, the organic color residue-containing or heterocyclic ring residue-containing amine derivative is a compound of the formula (2),

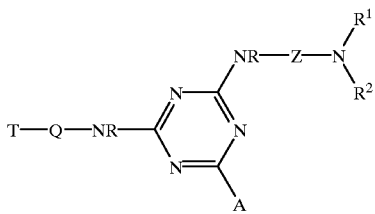
(2)

wherein A is a hydroxyl group or —N(R)—Z—N(R$^1$)R$^2$, P, X, Z, R, R$^1$ and R$^2$ have the same meanings as those in the formula (1), T is —NH$_2$, P—X— or a compound of the formula (3),

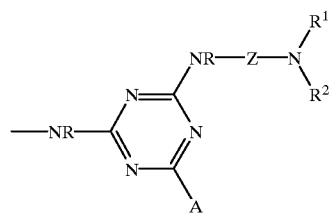
(3)

(in which, A is a hydroxyl group or —N(R)—Z—N(R$^1$)R$^2$, and P, X, Z, R, R$^1$ and R$^2$ have the same meanings as those in the formula (1)), and Q is a compound of the formula (4),

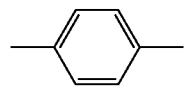
(4)

or a compound of the formula (5),

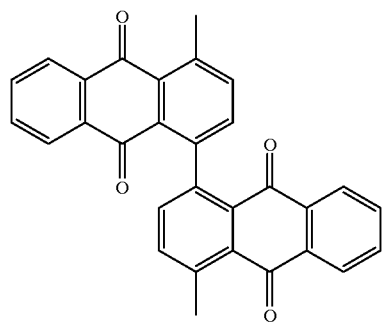
(5)

According to the present invention, the organic resin is at least one resin selected from the group consisting of an acryl resin, a polyvinyl acetal resin, a cellulose resin and an urethane resin.

According to the present invention, the silicon alkoxide compound or the metal alkoxide compound is a compound of the formula (6), M(OR$^3$)r (6)

wherein M is a silicon atom or a trivalent or tetravalent metal atom, R$^3$ is an alkyl group having 1 to 4 carbon atoms and r is an integer of 3 or 4, or its condensate.

According to the present invention, the coating composition further contains a polymerizable organic group-containing alkoxysilane compound.

According to the present invention, the coating composition further contains an organic ultraviolet-absorber.

According to the present invention, the coating composition further contains a frictional resistance-reducing agent.

According to the present invention, there is provided a process for the production of a coating composition for coloring a glass, which comprises kneading and dispersing an organic pigment, a pigment dispersant and an organic resin with a roll mill, to obtain a solid chip and then adding a silicon alkoxide compound or a metal alkoxide compound to the solid chip.

According to the present invention, there is provided a colored glass obtained by applying the above coating composition for coloring a glass to a glass.

DETAILED DESCRIPTION OF THE INVENTION

The silicon alkoxide compound or the metal alkoxide compound used in the present invention includes a compound of the formula (6) and its condensate. M in the formula (6) is Si or a trivalent or tetravalent metal. Examples of the metal include Ti, Ni, Zr, Zn, Al, Fe, Co and so on. A compound having Si, Ti, Zr or Al as M in the formula (6) is preferred. The silicon alkoxide compound or the metal alkoxide compound may be used alone or in combination as required, while it is not preferred to incorporate a large amount of transition metal element in terms of the necessity to be made colorless at a re-melting time.

The silicon alkoxide compound or the metal alkoxide compound used in the present invention may be a compound of the formula (6), its condensation polymer, a compound modified with an organic functional group and/or an organic resin or its condensation polymer. In particular, a condensation polymer having Si as M in the formula (6) is a polymer silicate of the formula (7), R$^3$(OSi(OR$^3$)$_2$)qOR$^3$ (7)

wherein R$^3$ is an alkyl group having 1 to 4 carbon atoms and q is an integer of 2 to 10.

Specifically, "Ethyl silicate 40" or "Methyl silicate 51", trade names, supplied by Mitsubishi Chemical Co, Ltd., may be used.

The organic pigment used in the present invention refers to an organic pigment used for printing inks and coating compositions, carbon black, black lead and the like. Specifically, examples of the organic pigment include phthalocyanin, azo, anthraquinone, quinacridone, dioxazine, diketopyrolopyrrol, isoindolinon, isoindoline, quinophthalone, anthrapyridine, anthanthrone, indanthrone, flavanthrone, perylene and perinone pigments, carbon black and black lead.

The amount of the organic pigment is preferably 0.01 to 200 parts by weight per 100 parts by weight of the silicon alkoxide compound or the metal alkoxide compound. When the amount of the organic pigment is smaller than 0.01 part by weight, sufficient tinting strength can not be obtained. When it is larger than 200 parts by weight, the strength of a thin film is decreased.

As a pigment dispersant used in the present invention, a surface active agent, a resin type dispersant, an organic color residue-containing or heterocyclic ring residue-containing amine derivative may be used alone or in combination. Further, a coupling agent, a chelate type dispersant, lecithin, or the like, may be added.

The organic color residue-containing or heterocyclic ring residue-containing amine derivative used in the present invention includes a compound of the formula (1) and a compound of the formula (2).

P in the formulae (1) and (2) is an organic color residue or a heterocyclic ring residue. The organic color residue include residues of phthlocyanine, insoluble azo, azo lake, anthraquinone, quinacridone, dioxazine, diketopyrolopyrrol, anthrapyridine, anthanthrone, indanthrone, flavanthrone, perylene, perinone and thioindigo.

The organic color residue may be selected from the above residues as required, while it is practically advantageous to use a residue having the same or similar structure and hue as/to those of an organic pigment to be used for the coating composition. That is, preferably, the use of such a residue not only produces a large effect on non-collectivity, non-crystallinity, fluidity or the like, but also gives only a small change of hue when compared with the case of using the organic pigment alone.

Examples of the heterocyclic ring residue include residues of thiophene, furan, xanthene, pyrole, imidazole, isoindoline, isoindolinone, benzimidazolone, indole, quinoline, carbazole, acridine, acridone and anthraquinone. When P in the formulae (1) and (2) is a heterocyclic ring residue, a colorless diamine derivative or a diamine derivative having almost no color can be obtained. Therefore, it is preferred in terms of general versability to use a compound having a heterocyclic ring residue as P in the formulae (1) and (2).

The bonding group "X" in the formulae (1) and (2) is a divalent bonding group which is composed of 2 to 15 atoms selected from the group consisting of S, C, N, O and H and has a chemically rational combination. Examples of "X" include —$SO_2$—, —CO—, —$CH_2$— —O—, —COO—, —NH—, —N=N— or a combination of these. Preferred is —$SO_2$—, —CO—, —$CH_2$—, or —$CH_2NHCOCH_2$—.

$R^1$ or $R^2$ in the formulae (1) and (2) is an alkyl group having 1 to 18 carbon atoms. As such an alkyl group, lower alkyl groups such as methyl, ethyl, propyl and butyl are preferred. The alkyl group may be branched in the maximum range of 18 carbon atoms and may be substituted. Further, in some cases, $R^1$ and $R^2$ may be mutually bonded, to form a five-membered or six-membered heterocyclic ring containing further N, O or S.

The process for the production of a compound of the formula (1) used in the present invention is as follows. A substituent such as —$SO_2Cl$, —COCl, —$CH_2Cl$ or —$CH_2NHCOCH_2Cl$ is introduced into an organic color or a heterocyclic ring by a known method and reacted with an amine compound having a structure of Z—N($R^1$)$R^2$ corresponding to the formula (1), to obtain an organic color derivative of the formula (1).

Examples of the amine compound having a structure of Z—N($R^1$)$R^2$ include N,N-dimethylaminomethylamine, N,N-dimethylaminoethylamine, N,N-diethylaminoethylamine, N, N-dibutylaminoethylamine, N,N-diethylaminopropylamine, N,N-dibutylaminopropylamine, N,N-dimethylaminobutylamine, N,N-diethylaminobutylamine, N,N-dipropylaminobutylamine, N,N-dibutylaminobutylamine, N,N-diethylaminohexylamine, N,N-diisobutylaminopentylamine, N,N-methyllaurylaminopropylamine, N,N-ethyl-hexylaminoethylamine, N,N-distearylaminoethylamine, N,N-dioleylaminoethylamine, N,N-distearylaminobutylamine, N,N-dimethylaminomethanol, N'N-dimethylaminoethanol, N,N-diethylaminoethanol, N,N-dibutylaminomethanol, N,N-dibutylaminoethanol, N,N-dibutylaminopropanol, N,N-diethylaminobutanol, N,N-dioleylbutanol, N-aminoethylpiperidine, N-aminoethyl-4-pipecoline, N-aminoethyl-4-pipecoline, N-aminoethylmorpholine, N-aminopropylpiperidine, N-aminopropyl-2-pipecoline, N-aminopropyl-4-pipecoline, N-aminopropylmorpholine, N-aminomethylpiperidine, N-hydroxymethylpiperidine, N-hydroxyethylpiperidine, N-hydroxypropylpiperidine, N-hydroxyethyl-2-pipecoline, N-hydroxypropyl-2-pipecoline, N-hydroxymethylpyrrolidine, N-hydroxyethylmorpholine, N-hydroxybutylmorpholine, N,N,N',N'-tetramethyldiethylenetriamine, N-aminopropylmorpholine and N-aminopropylthiazolidine.

The process for the production of a compound of the formula (2) used in the present invention is as follows. When T in the formula (2) is P—X—, P is chlorosulfonated by a general method and then reacted with a compound of the following formula (8), to obtain a compound of the formula (2). Otherwise, in the case where P is substituted with a sulfone group or a carboxyl group in advance, the substituted compound is chlorinated with thionyl chloride, phosphorous pentachloride, or the like, by a general method and then reacted with a compound of the following formula (8), to obtain a compound of the formula (2).

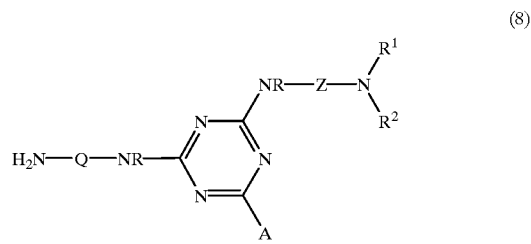

(8)

wherein Q, R, $R^1$, $R^2$ and A have the same meanings as those in the formulae (2) and (3).

The compound of the formula (8) can be produced, for example, by reacting a compound obtained by reacting p-amino-acetoanilide with cyanuric chloride in equimolar amounts, with an amine compound having a structure of Z—N ($R^1$) $R^2$, described above, and then hydrolyzing the reaction mixture with a hydrochloric acid aqueous solution, or the like. When one chlorine atom of cyanuric chloride is unreacted, the unreacted chlorine atom is hydrolyzed, to become a hydroxyl group.

The compound of the formula (8) can also be produced by reacting p-nitro-aniline in place of the p-amino-acetoanilide with an amine and then reducing a nitro group.

The compound of the formula (2) can be also produced by reacting a compound obtained by reacting diaminodianthraquinone with cyanuric chloride, with an amine compound having a structure of Z—N($R^1$)$R^2$, described above.

Specific examples of the organic color residue-containing or heterocyclic ring residue-containing amine derivative, which may be used in the present invention, are as follows.

Compound A
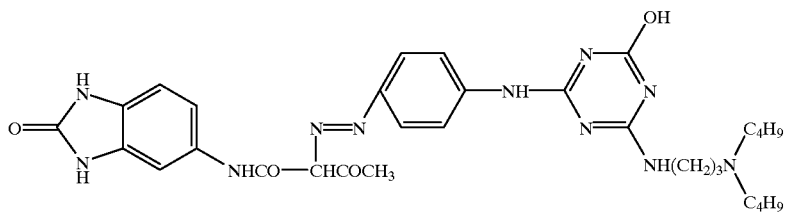
(10)
Compound B
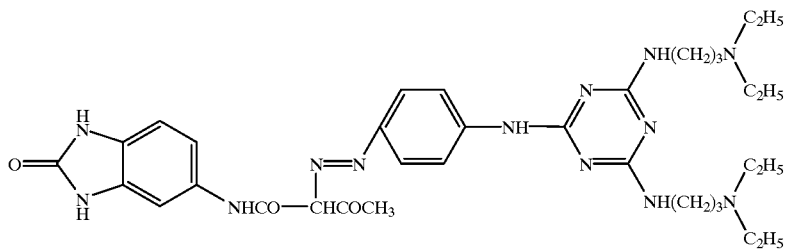
(11)
Compound C
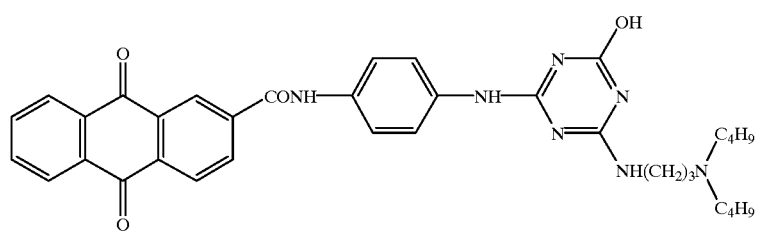
(12)
Compound D                               Compound E
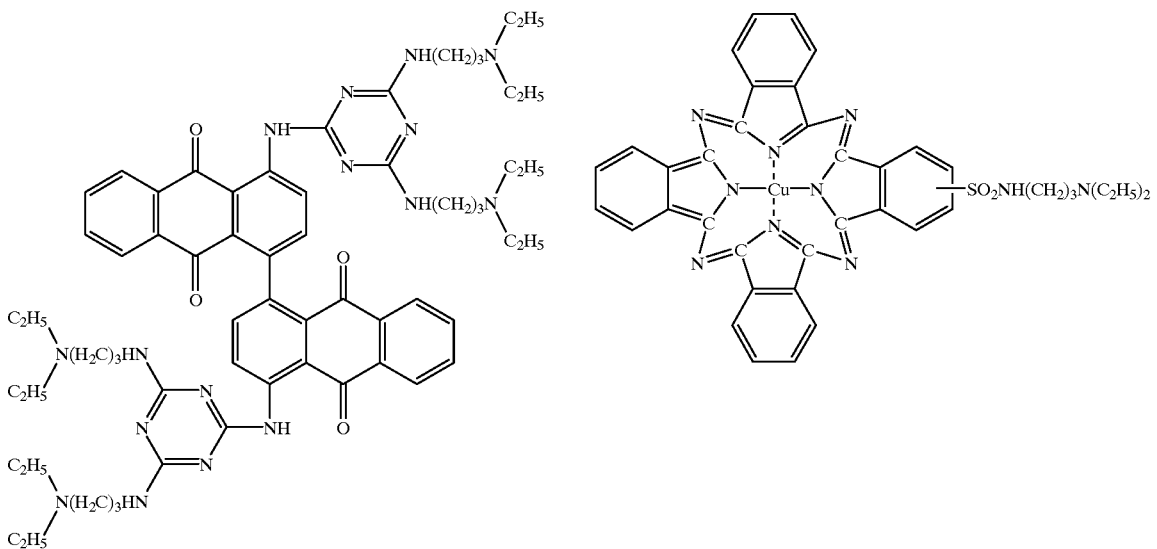
(13)                                         (14)

Compound F

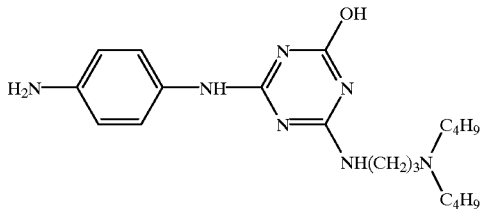

(15)

The organic color residue-containing or heterocyclic ring residue-containing amine derivative used in the present invention may be used in a dry powder state at a dispersing time of an organic pigment, or may be precedently mixed with an organic pigment before use. Further, after the organic color residue-containing or heterocyclic ring residue-containing amine derivative is dissolved or dispersed in a solvent or a mineral acid aqueous solution, the resultant solution/dispersion can be used. In this case, the amine derivative is added to a slurry of an organic pigment in water or a solvent and absorbed on the surface of the organic pigment. Otherwise, a powder, a solution or a dispersion of an organic color residue-containing or heterocyclic ring residue-containing amine derivative is added in a coupling step in the case of using an azo pigment, or in a pigmentation step such as a salt-milling method or a sulfuric acid bite method in the case of using a phthalocyanine, quinaqridone or dioxadine pigment, and absorbed to the surface of the pigment and filtrated, and optionally dried as required, to obtain an pigment composition. Then, the so-obtained pigment composition can be used.

The resin type dispersant used in the present invention refers to a high molecular copolymer which is obtained by bonding an alkali to a polyester compound or an acrylic polymer and which has a weight-average molecular weight of 1,000 to 100,000 and an amine value of 10 to 200 mgKOH/g. These resin type dispersants are disclosed in JP-A-60-166318, JP-A-61-174939, JP-A-46-7294, etc.

When the weight-average molecular weight is smaller than 1,000, sufficient steric hindrance can not be obtained and the effect of dispersion is decreased. When it is larger than 100,000, undesirably, agglutination is reversely caused in some cases.

The resin type dispersant may be a commercially available agent. For example, it includes "Solsperse24000", "Solsperse20000", supplied by Zeneca K. K., "Disperbyk-160", "Disperbyk-161", "Disperbyk-162", "Disperbyk-163" and "Disperbyk-182", supplied by Bickchemi.

As a surface active agent used in the present invention, an anionic, nonionic, cationic or amphoteric active agent is preferably used.

Examples of the anionic surface active agent include fatty acid salt, alkyl sulfate, alkyl aryl sulfonic acid salt, alkyl naphthalene sulfonic acid salt, dialkyl sulfonic acid salt, dialkyl sulfosuccinic acid salt, alkyl diaryl ether disulfonic acid salt, alkyl phosphoric acid salt, polyoxyethylene alkyl ether sulfuric acid salt, polyoxyethylene alkyl aryl ether sulfuric acid salt, naphthalene sulfonic acid formalin condensate, polyoxyethylene alkyl phosphate, glycerol borate fatty acid ester and polyoxyethylene glycerol fatty acid ester.

Examples of the nonionic active agent includes polyoxyethylene alkyl ether, polyoxyethylene alkyl aryl ether, a polyoxyethylene oxypropylene block copolymer, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylenealkylamine, a fluorine-containing nonionic active agent and a silicone-containing nonionic active agent.

Examples of the cationic active agent include alkylamine salt, quaternary ammonium salt, alkyl pyridinium salt and alkyl imidazolium salt.

Examples of the amphoteric active agent include alkylbetaine, alkylamine oxide, phosphatidyl choline.

As a coupling agent or a chelate type dispersant used in the present invention, a silane-containing coupling agent, a titanate-containing coupling agent and an aluminum-containing coupling agent and a silane-containing chelate type dispersant, a titanate-containing chelate type dispersant and an aluminum-containing chelate type dispersant are preferably used.

Examples of the silane-containing agents include vinyltrimethoxysilane, vinyltriethoxysilane, N-(2-aminoethyl)3-aminopropyltrimethoxysilane, 3-aminopropyltriethoxysilane, 3-glycidoxypropyltrimethoxysilane, 2-(3,4-epoxycyclohexyl)ethyltrimethoxysilane, 3-methacryloxypropyltrimethoxysilane and 3-mercaptopropyltrimethoxysilane.

Examples of the titanate-containing agents include isopropyltriisostearoyltitanate, isopropyltris (dioctylpyrophosphate)titanate, isopropyltri(N-aminoethyl-aminoethyl)titanate, tetraoctylbis(ditridecylphosphite) titanate, tetra(2,2-diallyloxymethyl-1-butyl)bis-(ditridecyl) phosphite titanate, bis(dioctylpyrophosphate) oxyacetatetitanate, isopropyltridodecylbenzensulfonyltitanate and isopropyltri-cumylphenyltitanate.

Examples of the aluminum-containing agents include acetoalkoxyaluminumdiisopropylate, ethylacetoacetatealuminumdiisopropylate, aluminum tris (ethylacetoacetate) and aluminum tris (acetylacetonate).

The coating composition for coloring a glass, provided by the present invention, may be produced by adding an organic pigment, a pigment dispersant and an organic resin to a solvent and dispersing the mixture with a sand grinder mill. Otherwise, an organic pigment, a pigment dispersant and an organic resin may be dispersed with a roll mill, to obtain a solid chip. A silicon alkoxide compound or a metal alkoxide compound and an additive are incorporated into the concentrated dispersion of the so-obtained pigment. Of these, the method of using a roll mill for obtaining a solid chip is preferred, since the organic pigment can be pulverized to primary particles with a high shearing force and the existence of the pigment dispersant can prevent the reaggregation of the organic pigment.

When an organic color residue-containing or heterocyclic ring residue-containing amine derivative is used as a pigment dispersant in the present invention, it is sufficient to merely mix the organic color residue-containing or heterocyclic ring residue-containing amine derivative with an organic pigment and an organic resin at a roll mill dispersing time. However, when the organic color residue-containing or heterocyclic ring residue-containing amine derivative is precedently mixed under heat with the organic pigment and the organic resin before the roll mill dispersing and the mixture becomes a dissolved state, not only the affinity of the above amine derivative and the organic resin is increased, but also the amine derivative is uniformly and promptly mixed with the organic pigment so that productivity is increased.

In the present invention, the amount of the pigment dispersant is 0.1 to 30 parts by weight per 100 parts by weight of the organic pigment. When the amount is smaller than 0.1 part by weight, the dispersion effect is poor. When the amount is larger than 30 parts by weight, no further effect can be expected.

The coating composition for coloring a glass of the present invention preferably contains a polymerizable organic group-containing alkoxysilane compound.

The polymerizable organic group-containing alkoxysilane compound includes a compound of the formula (9), $$R^4pSi(OR^5)_{4-p} \tag{9}$$

wherein $R^4$ is a polymerizable organic group, $R^5$ is an alkyl group having 1 to 4 carbon atoms and p is an integer of 1 to 3.

The compound of the formula (9) is an alkoxysilane compound having a polymerizable organic group "$R^4$". The polymerizable organic group refers to an organic group which has an unsaturated double bond, an organic group which has a ring cleavage cyclic group and in which the ring cleavage cyclic group is cleaved and repeatedly added, or an organic group in which polymerization additions are repeated.

Examples of the polymerizable organic group include groups having a polymerizable unsaturated double bond such as vinyl, 2-propenyl, isopropenyl, acryloyl, methacryloyl and γ-methacryloxypropyl, and ring cleavage cyclic groups such as a cyclic ether group, particularly a cyclic monoether group, a lactone group, a lactam group, acid anhydride, an isocyanate group (and hydroxyl group) and the like. Of these, vinyl or γ-methacryloxypropyl is preferred.

As such a compound, specifically, vinyltrimethoxysilane, vinyltriethoxysilane or γ-methacryloxypropyltrimethoxysilane is preferred. Further, these compounds may be used in combination.

The coating composition of the present invention may be dissolved or dispersed in a proper solvent. In this case, the solvent is selected depending upon the kind of a compound, the kind of a pigment or a dispersion condition. Generally, the solvent is selected from ethanol, propanol, butanol and the like. In view of a pigment dispersibility, butanol is preferred. When a glass coating film is made frosted, ethanol is preferred.

The coating composition of the present invention preferably contains the silicon alkoxide compound or the metal alkoxide compound and the polymerizable organic group-containing alkoxysilane compound in a ratio of 15:85 to 80:20 mol %.

Further, the use of a silicon alkoxide compound or a metal alkoxide compound which is modified with an organic functional group and/or an organic resin can thicken the thickness of a coating, impart flexibility and various resistances to a formed glass gel thin film and increase the shelf life of the coating composition. As a compound used for such a modification, a silane coupling agent, an acrylic resin, a polyester resin and an epoxy resin are included. Condensing a silicon alkoxide compound or a metal alkoxide compound with such a compound by a known method can modify the silicon alkoxide compound or the metal alkoxide compound.

As a solvent used for the above condensation, there maybe used almost all alcohols such as methanol, ethanol, isopropylalcohol, butanol, pentanol, methoxyethanol, ethoxyethanol and propoxyethanol. Further, an organic acid, an inorganic acid, an amine, a coupling agent, or the like, may be used as a catalyst.

The organic resin used in the present invention is not limited so long as it can be compatible with the silicon alkoxide compound or the metal alkoxide compound and has a pigment dispersing capability. However, organic resins having a specific polar group are preferred.

It is an organic resin which is condensed with —OH group of part of the metal alkoxide compound in a portion of a polar group, to cross-link tridimentionally and which has compatibility with the organic pigment and the pigment dispersant. The use of such an organic resin can impart flexibility other than high hardness, high heat-resistance, high chemical resistance and high density to a coating film. Further, The use of the above organic resin can increase the dispersibility of the organic pigment and also improve the coating composition in shelf life.

The polar group is preferably —OH, —COOH or —NCO. Further, the structure of the organic resin is not specially limited. However, in view of the compatibility with the metal alkoxide compound solution and the dispersibility of the organic pigment, the organic resin is preferably an acrylic resin, a polyvinylacetal resin, a cellulose resin or an urethane resin. The molecular weight of the organic resin is preferably, as a number average, 500 to 100,000, more preferably 1,000 to 50,000.

In the present invention, the amount of the organic resin is 0.1 to 150 parts by weight per 100 parts by weight of the organic pigment. When the amount is smaller than 0.1 part by weight, no effect is obtained. When it is larger than 150 parts by weight, the strength of the thin film is decreased.

The organic ultraviolet-absorber used in the present invention serves to improve the organic pigment in ultraviolet resistance. Further, the contents of a glass vessel, to which the coating composition containing an organic ultraviolet-absorber, provided by the present invention, is applied, are also improved in ultraviolet resistance. The structure of the above ultraviolet-absorber is not specially limited. Specific examples of the ultraviolet-absorber include benzotriazole-containing ultraviolet-absorbers and benzophenone-containing ultraviolet-absorbers.

Examples of the benzotriazole-containing ultraviolet-absorber include 2-(2-hydroxyphenyl-3,5-di-t-butylphenyl)benzotriazole, 2-(2-hydroxy-5-methylphenyl)benzotriazole, 2-(2-hydroxy-5-t-butylphenyl)benzotriazole, 2-hydroxyphenyl-5-chlorobenzotriazole, 2-(2-hydroxy-3,5-di-t-butylphenyl)-5-chlorobenzotriazole, 2-[2-hydroxy-3-(3,4,5,6-tetrahydrophthalimidomethyl)-5-methylphenyl]benzotriazole and 2-(2-hydroxy-3,5-dinonylphenyl)benzotrizole.

Examples of the benzophenone-containing ultraviolet-absorber include 2,4-dihydroxybenzophenone, 2-hydroxy-4-methoxybenzophenone, 2-hydroxy-4-octoxybenzophenone, 2,2'-dihydroxy-4-methoxybenzophenone, 2,2'-dihydroxy-4,4'- dimethoxybennnzophenone and 2-hydroxy-4-methoxy-5-sulfobenzophenone.

The amount of the organic ultraviolet-absorber used in the present invention is 0.01 to 5 parts by weight per 100 parts by weight of the coating liquor. When the amount is smaller than 0.01 part by weight, no effect can be obtained. When it is larger than 5 parts by weight, no further effect can be expected and, in some cases, the ultraviolet-absorber is eluted from the thin film.

In the present invention, the ratio of the total amount of the solid contents which are the organic pigment, the pigment dispersant, the silane alkoxide compound or the metal alkoxide compound, the organic resin and the additives, based on the total amount of the coating liquor is preferably 0.1 to 50% by weight. When the ratio of the total amount of the solid contents is smaller than 0.1% by weight, a practical film thickness can not be obtained. When it is larger than 50% by weight, the stability of the coating liquor has a problem.

Other additives may be added within the range where these additives do not impair the purpose of the present invention. The "other additives" include, for example, a crosslinking agent, a hydrolysis-preventing agent and a viscosity modifier.

The coating composition for coloring a glass, provided by the present invention, may further contain a frictional resistance-reducing agent for reducing frictional resistance, in particular a friction by sliding, after the coating film is formed. The frictional resistance-reducing agent is incorporated into a coating liquor. And after the cure of the coating film, the frictional resistance-reducing agent serves to decrease the coefficient of frictional resistance by sliding of a coating film surface by the effect of smoothing the surface, the effect of adjusting a coating hardness properly and other effects.

Therefore, when the glass coating film-forming coating composition of the present invention contains such a frictional resistance-reducing agent and is used for coating a substance, the occurrence of scuff on the coating film surface is decreased in a case where the coating film is contacted with other substance.

The frictional resistance-reducing agent used for the glass coating film-forming coating composition of the present invention may be any agent unless it impairs the effect of the present invention. Example of the frictional resistance-reducing agent include modified polysiloxan-containing frictional resistance-reducing agents. More specifically, S030, trade name, supplied by Defra (Germany), is listed.

A coating method of forming a colored glass gel thin film on a glass substrate surface is not specially limited, while the coating liquor composition of the present invention is applied onto a glass surface with a coating device such as a spin coater, a roll coater, a dip coater, a wheel coater or a bar coater, so as to have a film thickness of preferably 0.1 to 5 $\mu$m. more preferably 0.5 to 3 $\mu$m, after calcination.

When the thickness is smaller than 0.1 $\mu$m, tinting strength is insufficient. When it is larger than 5 $\mu$m, cracks, white haze, blurs, etc. appear in some cases. Further, the colored glass gel thin film formed on the glass substrate surface also has the function of increasing the glass substrate itself in resistance to flaw and resistance to shock by preventing the occurrence of flaw of the glass substrate itself. When the thickness is smaller than 0.1 $\mu$m, sufficient effect of the above function can not be expected.

After the coating liquor composition of the present invention is applied onto a glass substrate surface, a colored glass gel thin film can be formed on the glass substrate surface by drying and calcining the coated glass substrate. The calcination temperature is preferably 300 ° C. or less in terms of preventing the decomposition of the organic pigment and the organic color derivative.

Otherwise, when the coating liquor contains a photopolymerization initiator, the coating liquor can be cured by irradiating a light for initiating a polymerization reaction. The light is generally a visible light or ultraviolet light, while ultraviolet light is preferred. The light source may be any one, while a mercury lamp, a xenon discharge tube, a hydrogen discharge tube, black light lamp, various laser light sources, and the like are listed.

Each of the light irradiation and the heat-treatment can cure a coating liquor alone, while it is preferred to use the both of them in combination in view of the contraction of a heat-treatment time and the manifestation of a higher hardness.

EFFECT OF THE INVENTION

As described above, according to the present invention, there can be obtained a coating composition for coloring a glass, which is excellent in fluidity and shelf life, which has desired ultraviolet and visible light absorbing properties, water-resistance, resistance to ultraviolet and resistance to flaw when applied to glass, which is excellent in gloss, transparency, clearness and tinting strength and which can be recycled, a process for the production thereof and use thereof.

EXAMPLES

The present invention will be explained with reference to Examples, hereinafter. In Examples, "part" stands for "part by weight".

Example 1

7.5 parts of "Chromophthal Red A2B" (supplied by Ciba Geigy, C. I. Pigment Red 177), 3.0 parts of polyvinylacetal resin, 89.1 parts of 1-butanol and 0.4 part of a pigment dispersant (Compound D) are fully dispersed with a sand grinder mill, to obtain a red dispersion composition. 6.5 parts of tetraethoxysilane, 1.2 part of water, 1.0 part of nitric acid, 2.0 parts of methanol, 18.0 parts of ethanol, 2.0 parts of 2-propanol and 35.9 parts of 1-butanol are mixed with 33.4 parts of the red dispersion composition with a mixer, to obtain a red coating composition.

Example 2

15.0 parts of "Lionol Blue FG7351" (supplied by Toyo Ink Manufacturing Co., Ltd., C. I. Pigment Blue 15:3), 6.0 parts of polyvinylacetal resin, 78.2 parts of 1-butanol and 0.8 part of a pigment dispersant (Compound E) are fully dispersed with a sand grinder mill, to obtain a blue dispersion composition. 6.5 parts of tetraethoxysilane, 1.2 part of water, 1.0 part of nitric acid, 2.0 parts of methanol, 18.0 parts of ethanol, 2.0 parts of 2-propanol and 52.6 parts of 1-butanol are mixed with 16.7 parts of the blue dispersion composition with a mixer, to obtain a blue coating composition.

Example 3

15.0 parts of "Paliotol yellow L1820" (supplied by BASF, C. I. Pigment Yellow 139), 6.0 parts of polyvinylacetal resin, 78.2 parts of 1-butanol and 0.8 part of a pigment dispersant (Compound C) are fully dispersed with a sand grinder mill, to obtain an yellow dispersion composition. 6.5 parts of tetraethoxysilane, 1.2 part of water, 1.0 part of nitric acid, 2.0 parts of methanol, 18.0 parts of ethanol, 2.0 parts of 2-propanol and 52.6 parts of 1-butanol are mixed with 16.7 parts of the yellow dispersion composition with a mixer, to obtain an yellow coating composition.

Example 4

1.3 parts of tetraethoxysilane, 1.3 parts of "Ethyl Silicate 40" (trade name; supplied by Mitsubishi Chemical Co., Ltd.), 3.9 parts of vinyltrimethoxysilane, 1.2 part of water, 1.0 part of nitric acid, 2.0 parts of methanol, 18.0 parts of ethanol, 2.0 parts of 2-propanol and 52.6 parts of 1-butanol are mixed with 16.7 parts of the blue dispersion composition obtained in Example 2 with a mixer, to obtain a blue coating composition.

Example 5

68.8 parts of "Chromophthal Red A2B" (supplied by Ciba Geigy, C. I. Pigment Red 177), 27.5 parts of polyvinylacetal resin and 3.7 parts of a pigment dispersant (Compound D) are treated with a two roll mill twenty times, to obtain a solid chip. 10.9 parts of the solid chip was dissolved with 89.1 parts of 1-butanol, and dispersed fully with a sand grinder mill, to obtain a red dispersion composition. 6.5 parts of tetraethoxysilane, 1.2 part of water, 1.0 part of nitric acid, 2.0 parts of methanol, 18.0 parts of ethanol, 2.0 parts of 2-propanol and 35.9 parts of 1-butanol are mixed with 33.4 part of the red dispersion composition with a mixer, to obtain a red coating composition.

Example 6

68.8 parts of "Lionol Blue FG7351" (supplied by Toyo Ink Manufacturing Co., Ltd., C. I. Pigment Blue 15:3), 27.5 parts of polyvinylacetal resin and 3.7 parts of a pigment dispersant (Compound E) are treated with a two-roll mill twenty times, to obtain a solid chip. 21.8 parts of the solid chip was dissolved with 78.2 parts of 1-butanol and dispersed fully with a sand grinder mill, to obtain a blue dispersion composition. 6.5 parts of tetraethoxysilane, 1.2 part of water, 1.0 part of nitric acid, 2.0 parts of methanol, 18.0 parts of ethanol, 2.0 parts of 2-propanol and 52.6 parts of 1-butanol are mixed with 16.7 part of the blue dispersion composition with a mixer, to obtain a blue coating composition.

Example 7

68.8 parts of "Paliotol yellow L1820" (supplied by BASF, C. I. Pigment Yellow 139), 27.5 parts of polyvinylacetal resin and 3.7 parts of a pigment dispersant (Compound C) are treated with a two-roll mill twenty times, to obtain a solid chip. 21.8 parts of the solid chip was dissolved with 78.2 parts of 1-butanol and dispersed fully with a sand grinder mill, to obtain an yellow dispersion composition. 6.5 parts of tetraethoxysilane, 1.2 part of water, 1.0 part of nitric acid, 2.0 parts of methanol, 18.0 parts of ethanol, 2.0 parts of 2-propanol and 52.6 parts of 1-butanol are mixed with 16.7 part of the yellow dispersion composition with a mixer, to obtain an yellow coating composition.

Example 8

1.3 parts of tetraethoxysilane, 1.3 parts of "Ethyl Silicate 40" (trade name; supplied by Mitsubishi Chemical Co., Ltd.), 3.9 parts of vinyltrimethoxysilane, 1.2 part of water, 1.0 part of nitric acid, 2.0 parts of methanol, 18.0 parts of ethanol, 2.0 parts of 2-propanol and 52.6 parts of 1-butanol are mixed with 16.7 parts of the blue dispersion composition obtained in Example 6 via two-roll mill using dispersion, with a mixer, to obtain a blue coating composition.

Example 9

A red coating composition was obtained in the same manner as. in Example 5, except that the pigment dispersant (Compound D) was replaced with a surface active agent, "NewcolB10" (supplied by Nihon Nyukazai).

Example 10

A red coating composition was obtained in the same manner as in Example 5, except that the pigment dispersant (Compound D) was replaced with a resin type dispersant, "Solsperse 24000" (supplied by Zeneca K. K.).

Comparative Examples 1 to 4

Colored compositions were obtained in the same manners as those of Examples 1 to 4, except that the pigment dispersants were not used.

Each of the coating compositions obtained in Examples 1 to 10 and Comparative Examples 1 to 4 was measured for the average particle diameter of a pigment. Further, each of the compositions was applied so as to have a film thickness of 1.5 μm and then the film was measured for a haze rate. Table 1 shows the results.

TABLE 1

| Example | Haze rate | Average particle diameter |
|---------|-----------|---------------------------|
| Ex. 1   | 7.2       | 0.24                      |
| Ex. 2   | 0.8       | 0.13                      |
| Ex. 3   | 5.0       | 0.17                      |
| Ex. 4   | 0.8       | 0.13                      |
| Ex. 5   | 5.1       | 0.19                      |
| Ex. 6   | 0.7       | 0.13                      |
| Ex. 7   | 3.6       | 0.14                      |
| Ex. 8   | 0.7       | 0.12                      |
| Ex. 9   | 0.9       | 0.15                      |
| Ex. 10  | 0.8       | 0.14                      |
| C Ex. 1 | 26.2      | 0.39                      |
| C Ex. 2 | 1.5       | 0.20                      |
| C Ex. 3 | 9.1       | 0.21                      |
| C Ex. 4 | 1.3       | 0.19                      |

Ex. = Example, C Ex. = Comparative Examples.

What is claimed is:

1. A process for the production of a coating composition for coloring glass, which comprises kneading and dispersing an organic pigment, a pigment dispersant and an organic resin with a roll mill, to obtain a solid chip and then adding a silicon alkoxide compound or a metal alkoxide compound to the solid chip.

2. The process according to claim 1, wherein the coating composition further contains a polymerizable organic group-containing alkoxysilane compound.

3. The process according to claim 2, wherein the polymerizable organic group-containing alkoxysilane compound is a compound of the formula (9), $$R^4_p Si(OR^5)_{4-p} \tag{9}$$

wherein $R^4$ is a polymerizable organic group, $R^5$ is an alkyl group having 1 to 4 carbon atoms and p is an integer of 1 to 3.

4. The process according to claim 1, wherein the pigment dispersant is at least one selected from the group consisting of a surface active agent, a resin dispersant and an organic color residue-containing a heterocyclic ring residue-containing alkyl amine compound.

5. The process according to claim 4, wherein the organic color residue-containing or heterocyclic ring residue-containing alkyl amine compound is a compound of the formula (1), $$P\text{---}\{X\text{---}Y\text{---}Z\text{---}N(R^1)R^2\}_n \tag{1}$$

wherein P is an organic color residue or a heterocyclic ring residue, X is a divalent bonding group which is composed of 2 of 15 atoms selected from the group consisting of S, C, N, O and H and has a chemically rational combination, Y is a direct bond or —N(R)—, in which R is H, an alkyl group having 1 to 18 carbon atoms or —Z—N(R$^1$)R$^2$, wherein Z is an alkylene group having 1 to 6 carbon atoms, each of R$^1$ and R$^2$ is a heterocyclic ring which may contain N, O or S, and n is an integer of 1 to 3.

6. The process according to claim 4, wherein the organic color residue-containing or heterocyclic ring residue-containing alkyl amine compound is a compound of the formula (2),

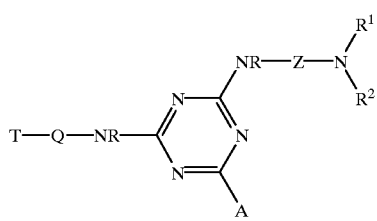

(2)

wherein A is a hydroxyl group or —N(R)—Z—N(R$^1$)R$^2$, Z is an alkylene group having 1 to 6 carbon atoms, R is H, an alkyl group having 1 to 18 carbon atoms or —Z—N(R$^1$)R$^2$, each of R$^1$ and R$^2$ is independently an alkyl group having 1 to 18 carbon atoms or a combination of R$^1$ and R$^2$ is a heterocyclic ring which may contain, N, O or S, T is —NH$_2$, P—X—, wherein P is an organic color residue or a heterocyclic ring and X is a divalent bonding group which is composed of 2 to 15 atoms selected from the group consisting of S, C, N, O and H and has a chemically rational combination, or a moiety of the formula (3),

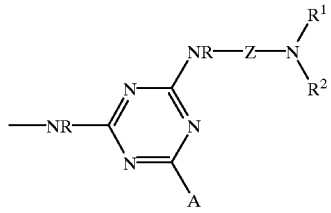

(3)

in which A, Z, R, R$^1$ and R$^2$ have the same meanings as above, and Q is a moiety of the formula (4),

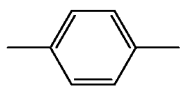

(4)

or a moiety of the formula (5),

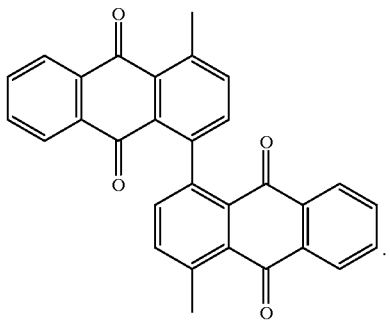

(5)

7. The process according to claim 1, wherein the organic resin is at least one resin selected from the group consisting of an acrylic resin, a polyvinyl acetyl resin, a cellulose resin and an urethane resin.

8. The process according to claim, wherein the silicon alkoxide compound or the metal alkoxide compound is a compound of the formula (6), $$M(OR^3)r \tag{6}$$

wherein M is a silicon atom or a trivalent or tetravalent metal atom, R$^3$ is an alkyl group having 1 to 4 carbon atoms and r is an integer equal to a valence of M or its condensate.

9. The process according to claim 8, wherein the silicon alkoxide compound or the metal alkoxide compound is a condensation polymer of the formula (7), $$R^3(OSi(OR^3)_2)qOR^3 \tag{7}$$

wherein R$^3$ is an alkyl group having 1 to 4 carbon atoms, and q is an integer of 2 to 10.

10. The process according to claim 8, wherein the silicon alkoxide compound or the metal alkoxide compound is a compound modified with an organic functional group and/or organic resin.

* * * * *